March 23, 1943.  M. A. WHITE  2,314,747
FISHING ROD HOLDER
Filed Dec. 21, 1940  2 Sheets-Sheet 2
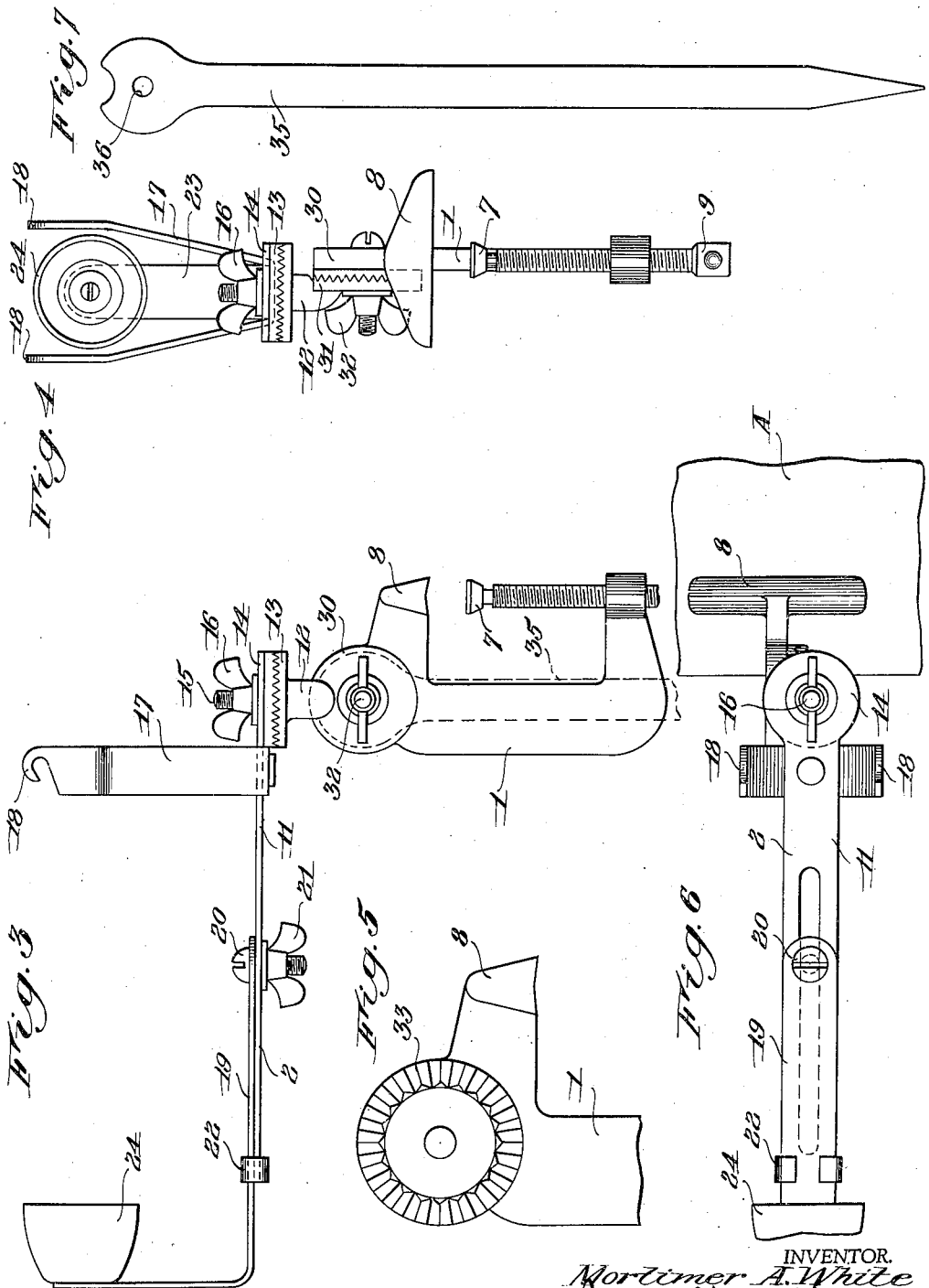
INVENTOR.
Mortimer A. White
BY Russell B. Griffith
his Attorney Patented Mar. 23, 1943

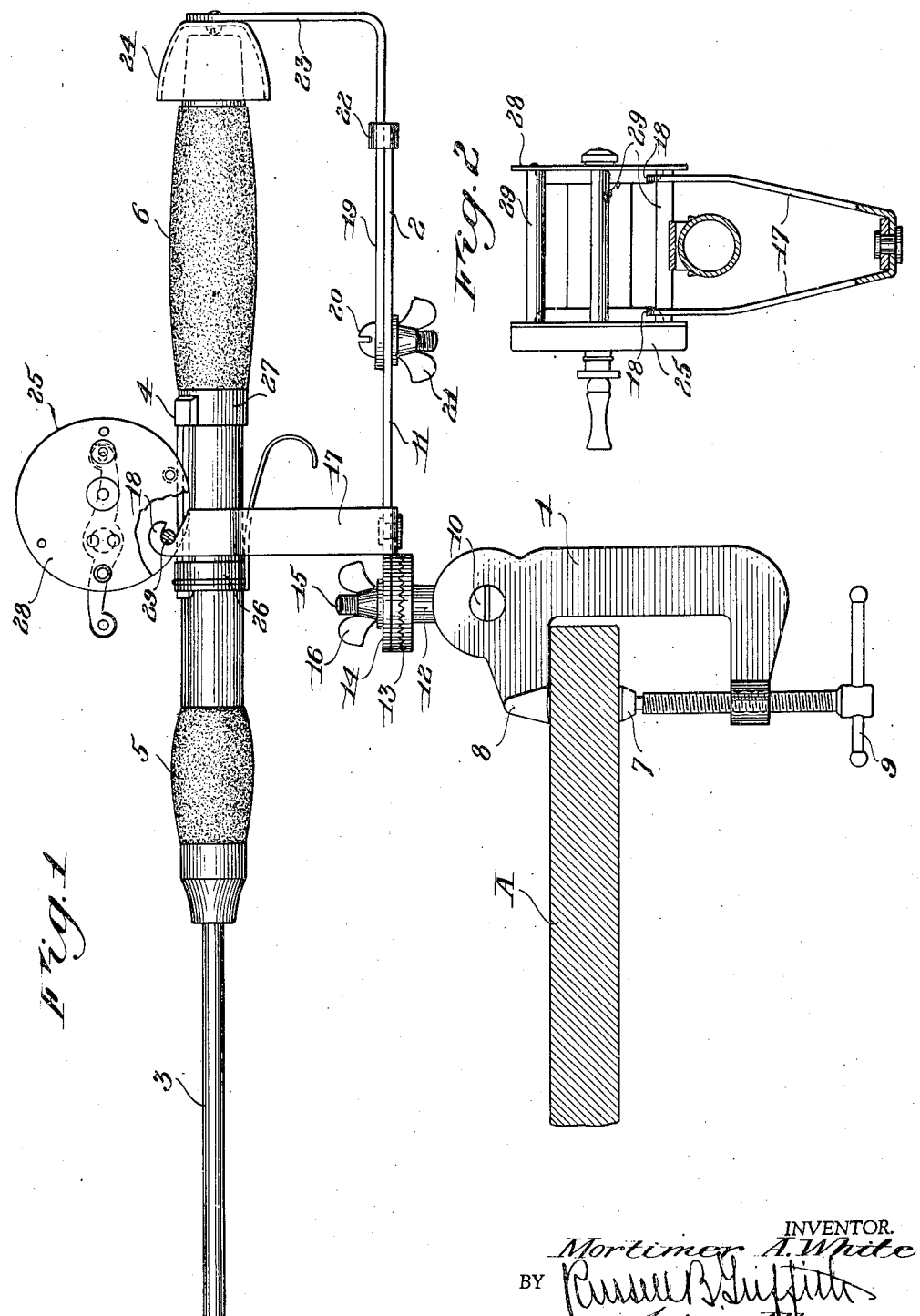

2,314,747

UNITED STATES PATENT OFFICE 2,314,747

FISHING ROD HOLDER

Mortimer A. White, Rochester, N. Y.

Application December 21, 1940, Serial No. 371,095

2 Claims. (Cl. 248—42)

My present invention relates to sporting goods and more particularly to devices for holding fishing rods while the fisherman is otherwise engaged. The invention contemplates the use of the device as an attachment upon the seats, thwarts, and similar structures of a fisherman's expeditionary equipment including also means for attaching the device to an earth bank where the fisherman might be still fishing from the shore. The invention has for its object to provide a simple device, inexpensive to manufacture that will conveniently support the usual rod and reel in a secure manner requiring the attention of the fisherman only when he has a strike or a nibble from a game or other fish. The improvements are directed toward the means for attaching the device to a boat or similar structure; toward means whereby the initial thrust of the fish is taken up directly upon the reel attached to the rod that is being used, and toward means whereby the device is not only adjustable to fishing rods of different sizes, but is so equipped that it holds the rod securely as against the strike of the fish and yet allows the fisherman, with a simple movement, to disengage the rod from the holder and carry out the landing of the fish by hand.

To these and other ends, the invention resides in certain improvements and combination of parts, all as will be hereinafter more fully described, the novel features being pointed out in the claims at the end of this specification.

In the drawings:

Figure 1 is a side elevation of a fishing rod holder, constructed in accordance with and illustrating one embodiment of my invention, the attaching part of a boat being shown in section;

Figure 2 is a front view thereof taken in section through the fishing rod and partly through the reel engaging means;

Figure 3 is a side elevation directionally reversed from the showing of Figure 1, but with the rod, that is to be held, removed;

Figure 4 is a front view of the device as shown in Figure 3;

Figure 5 is an enlarged detail of an adjusting connection;

Figure 6 is a top plan view of the device as shown in Figs. 3 and 4, and

Figure 7 is a detail of an earth anchorage to be used by fisherman operating from a bank or short as distinguished from boat fishing.

Similar reference numerals throughout the several views indicate the same parts.

In general, my invention contemplates a fishing rod holder that supports the rod rearwardly, of an attaching portion that may be engaged with the stern seat, the gunwhale or other convenient part of a boat. This brings the handle or butt of the rod well within the boat where it is convenient for the fisherman and yet affords adequate support for either still fishing or trolling, in which connection it is observed that the device of my invention also provides for conveniently and definitely changing the angle of the held rod so that, for instance, three rods can be supported from the stern of a boat, one of the holders being adjusted to trail directly astern and the other two at angles such as that the three lines overboard will not be entangled.

Referring more particularly to the drawings, it is here first explained that I have invented the novel idea of so attaching the rod to the holder that the reel on the rod is directly engaged whereby the pull of a hooked fish is not transmitted through the rod to the reel but directly to the reel.

In Figure 1, which shows the whole set-up, 1 indicates generally the base structure, 2 the superstructure and 3 the rod, the latter having reel securing means 4, a forward grip 5 and a rear grip 6 constituting the butt.

The base element 1 comprises, in the present instance, a clamp frame having a threaded jaw 7 that is screwed up against the fixed jaw 8 by means of a handle 9 to secure this base member to a fitting A, such as the stern seat of a rowboat. Pivoted at 10 to the clamping jaw 1 is a superstructure embodying a rearwardly extending strap 11. The said pivot 10 is that of a post 12 terminating in a horizontal serrated disk 13. This disk is the complement of a similar disk 14 on the forward end of element 11 that engages a threaded post 15 on which turns a wing nut 16. By this means the clamp 7—8 of the base 1 attached to the stern seat A, for instance, forms a support whereby the superstructure 11 may be turned at different angles and clamped to the portion 12 by means of the counter engaging head 13 so that the rod 3 may be disposed at any desired angle with reference to the stern of the boat and the stern seat A.

The rearwardly extending superstructure 11 is fitted with upstanding yoke arms 17 that arise therefrom adjacent to turret post 15. The yoke arms 17 terminate above in rearwardly turned hooks 18.

Slidable upon superstructure arm 11, both of which are slotted, is an adjustable extension arm 19 of the same nature, the two being held together by a bolt 20 in cooperation with a wing nut 21. At the rear is a belt 22 holding these relatively slidable parts in alinement. The extension arm 19 rises at right angles at the rear, as indicated at 23, to provide a spring arm carrying a butt socket 24 opening forwardly.

The general idea is this: The clamp 7, 8 and 9 being secured to the stern seat, for instance, the resilient socket 24 takes the butt end of the rod grip 6. The forward spring activity of upright arm 23 has a tendency to thrust the whole rod forwardly. In the meantime, the latter has been engaged with the rod through the medium of the line reel 25 secured to the rod in the customary manner between grip 5 and rear grip 6, by the usual sleeves 26 and 27. The standard fishing reel for attachment to rods of this character comprises cheek pieces 28 connected by transverse rods 29. It is the function of the hooks 18 on yoke arms or standards 17 to directly engage cross-bars 29 at the top of the latter from a frontal point so as to grip the reel and urge the rod handle 6, by which the latter is carried, toward the resiliently supported socket 24.

Thus, in applying the rod to the holder, the butt is placed casually into the socket 24, slight rearward pressure is applied to the grips or hand holds 6, and, with a downward movement, the reel 25, already attached to the rod, is pressed down so that the hooks 18 on the standards 17 engage and securely hold the transverse rods 29 of the reel as beforementioned.

It will be observed that with this arrangement when a fish strikes the line the pull thereof is transmitted directly, not to the rod, but to the reel 25 which yoke arm standards 17 being hooked into the reel at 18 are best adapted to withstand this pull. There is therefore no liability of the rod being cast overboard and lost by the pull of the fish due to detachment of the rod from its holder because the direct pull is upon the reel and the reel is securely held.

The function of the relatively telescopic arrangement of the slotted superstructure plate 11 and the similarly slotted extension arm 19 thereof as secured by the bolt 20 and wing nut 21 is obviously to take care of large and small rods in which the distances between the butts of the latter and the point of attachment of the reels 28 vary. In other words, the device is so adjusted through bolt 20 that as the butt from the handle 6 of the rod is engaged with the resilient socket 24, with a rearward movement, the hooks 18 on yoke arms 17 will snap into engagement with the appropriate transverse cross rod 29 of the reel 25.

When a fish strikes at the bait and is hooked on the line (not shown) attached to the rod, the pull, as aforesaid, comes directly upon the drum of the reel 25. The attendant fisherman noticing this can instantly pick up the rod for hand operation by grasping either grips 5 or 6 or both of them and give the rod a momentarily rearward pull. This disengages the hooks 18 and allows the rod to be instantly raised up for the ordinary hand manipulation of landing the fish.

Conversely, after the line is rebaited and is again cast out for trolling or still fishing, as the case may be, all the operator has to do is to insert the butt of grip 6 into the socket 24 with a rearward movement and the hooks 18 thereupon again snap over the bar 29 of the reel in which engagement said hooks are retained by the resiliency of upright spring arms 23 at the rear.

I have already described the toothed cooperation of the disk 13 on the base member with the complementary disk 14 on the forward part of the superstructure arm 11 that gives the angle with which the held rod is disposed with reference to the stem and stern progress of the boat to which the device is attached. In addition to this, provision is made for varying the angle of the rod so that the line will not only trail for deep or shallow fishing, but, for instance, provision is made so that two lines on different rods trailing for trolling purposes at the stern of a boat can be kept adequately apart so that they will not foul one another. This consists of an adjustment on the pivot 10. Namely, the jaw 8 and/or base clamping element 1 is fitted on the side with a toothed disk 30 as a part of its integral structure cooperating with a similar toothed disk 31 of similar design that is held thereto by another wing nut 32 so that by rotating post 12 on this pivot 10 the teeth can be intermeshed in locking engagement at any degree of angle desired.

It will, therefore, be seen that the base support may be clamped to the seat, thwart, or any convenient portion of the fishing boat; can be turned horizontally to give the desired angle of the rod to the wake of the boat. Also, the pivot 10 between the base element 1 and the superstructure 11, through cooperating toothed disks 30 and 31 and wing nut 32, give opportunity for changing the angle of the rod as it is trolled astern, for instance, and the angle at which the line reaches the water for deep or shallow fishing.

For fishing from the shore, where there is no contiguous means for attaching the clam 7—8, I provide a device for anchoring the holder in the earth. This consists of a sharpened post 35 having an eye 36 at its upper end by means of which it is attached to pivot bolt 10 and secured by wing nut 32. In the use of this post and through the instrumentalities of toothed disks 30 and 31, the clamp 1 may be spread forwardly as a bracing leg, the post 35 thrust in the ground and the whole device thus supported without the use of the clamp. In such an instance, post 35 can be carried down so far that the pivot 36 is very close to the horizontal giving a rigidity to the supported rod in combination with the contact of the butt holding element 9 with the surface of the ground.

It is to be observed that with my present device, the holding elements, namely, the butt socket 24 and the yoke hooks 17—18 forwardly thereof, are all maintained in rear of the attaching point 7—8, hence the attachment supports the manipulatable portions of the rod within the boat, if so attached, rather than requiring the tender to reach overboard to manipulate the same.

I claim as my invention:

1. In a fishing rod holder, the combination with a base support and a superstructure carried thereby embodying a rearwardly arranged cup shaped socket for the base end of the rod resisting its movement both rearwardly and laterally and rigid hooked retaining members rising therefrom adapted to interlock over the crossbars of a winding reel in its usual position on such rod, the superstructure being laterally rotatably supported on the base support at a point forwardly of the retaining members for horizontal angular adjustment.

2. In a fishing rod holder, the combination with a base support embodying a clamp, of a partially resilient superstructure mounted thereon by means of a forwardly arranged horizontal pivot having adjustable clamping means varying its inclination in a vertical plane, the whole of the said superstructure extending rearwardly from the pivot, a fishing rod butt socket on the rear end of the superstructure, and a reel engaging device on the forepart of the structure.

MORTIMER A. WHITE.